Figure 5:
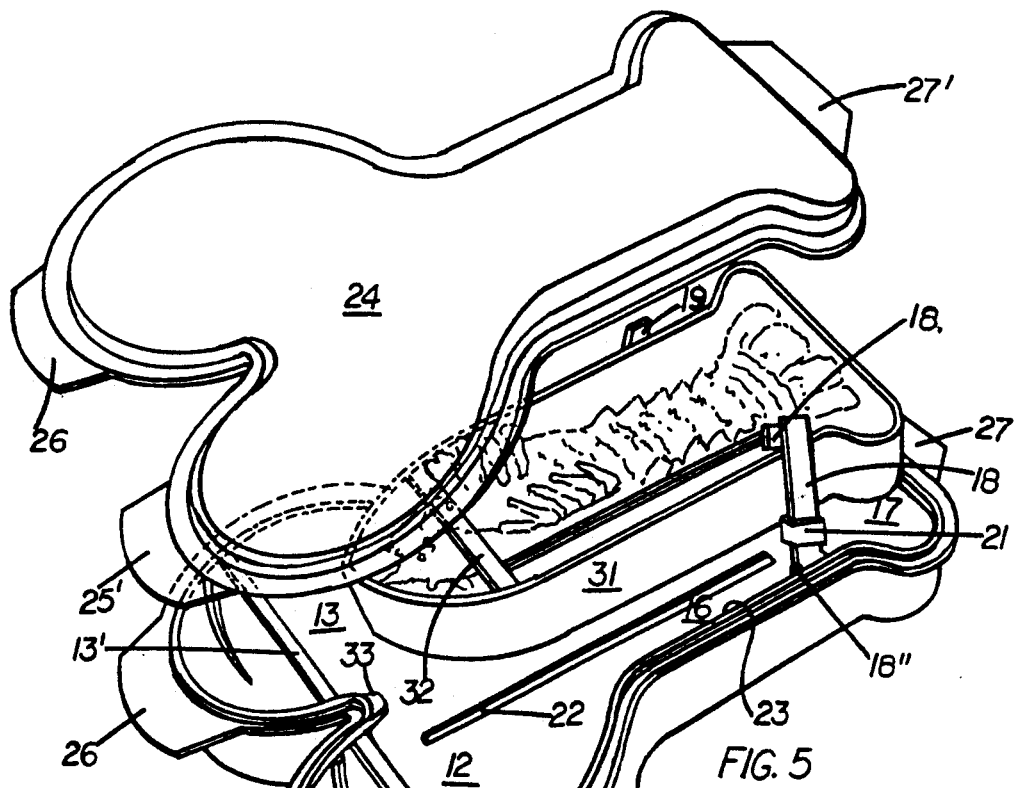

United States Patent
Cyr

[11] Patent Number: 5,278,376
[45] Date of Patent: Jan. 11, 1994

[54] LOBSTER COOKING VESSEL FOR MICROWAVE OVENS

[76] Inventor: Samuel A. Cyr, Post Office Box 480, St. Basile, New Brunswick, Canada, E0L-140

[21] Appl. No.: 979,850
[22] Filed: Nov. 23, 1992
[51] Int. Cl.⁵ .............................................. H05B 6/80
[52] U.S. Cl. .............................. 219/734; 99/DIG. 14; 99/441; 219/732
[58] Field of Search ............ 219/10.55E; 99/DIG. 14, 451, 426, 441, 428, 416; 426/107, 234, 241, 243

[56] References Cited

U.S. PATENT DOCUMENTS

| | | | |
|---|---|---|---|
| 2,540,036 | 1/1951 | Spencer | 219/10.55 E |
| 4,081,646 | 3/1978 | Goltsos | 219/10.55 E |
| 4,894,247 | 1/1990 | Fong | 426/107 |
| 4,908,487 | 3/1990 | Sarnoff et al. | 219/10.55 E |
| 4,941,401 | 7/1990 | Sarnoff et al. | 99/446 |
| 5,005,703 | 4/1991 | Bodker | 206/563 |
| 5,085,879 | 2/1992 | Elbaz | 426/129 |
| 5,106,635 | 4/1992 | McCutchan et al. | 426/107 |

*Primary Examiner*—Philip H. Leung
*Attorney, Agent, or Firm*—Laforest S. Saulsbury

[57] ABSTRACT

This invention covers a shallow bottom part adapted to receive an individual lobster from the Homaridae family on its back, shaped generally of lobster shape, with claw-shaped portions for receiving the lobster's claws and an elongated portion extending therefrom receiving the lobster's tail. Extending across the claw-shaped portions are retaining strips to retain the respective claws of the lobster and breakaway parts hinged from the respective opposite sides of the elongated tail portion which when joined retain the lobster's tail and with the claws retained, release of the live lobster by itself is prevented when the bottom part containing the lobster and the cover extending thereover is placed in the microwave oven for the cooking operation. For cooking a Rock lobster from the Palinuridae family or crayfish without claws, a liner is provided that is without claw-shaped portions to better confine the clawless lobster.

8 Claims, 2 Drawing Sheets

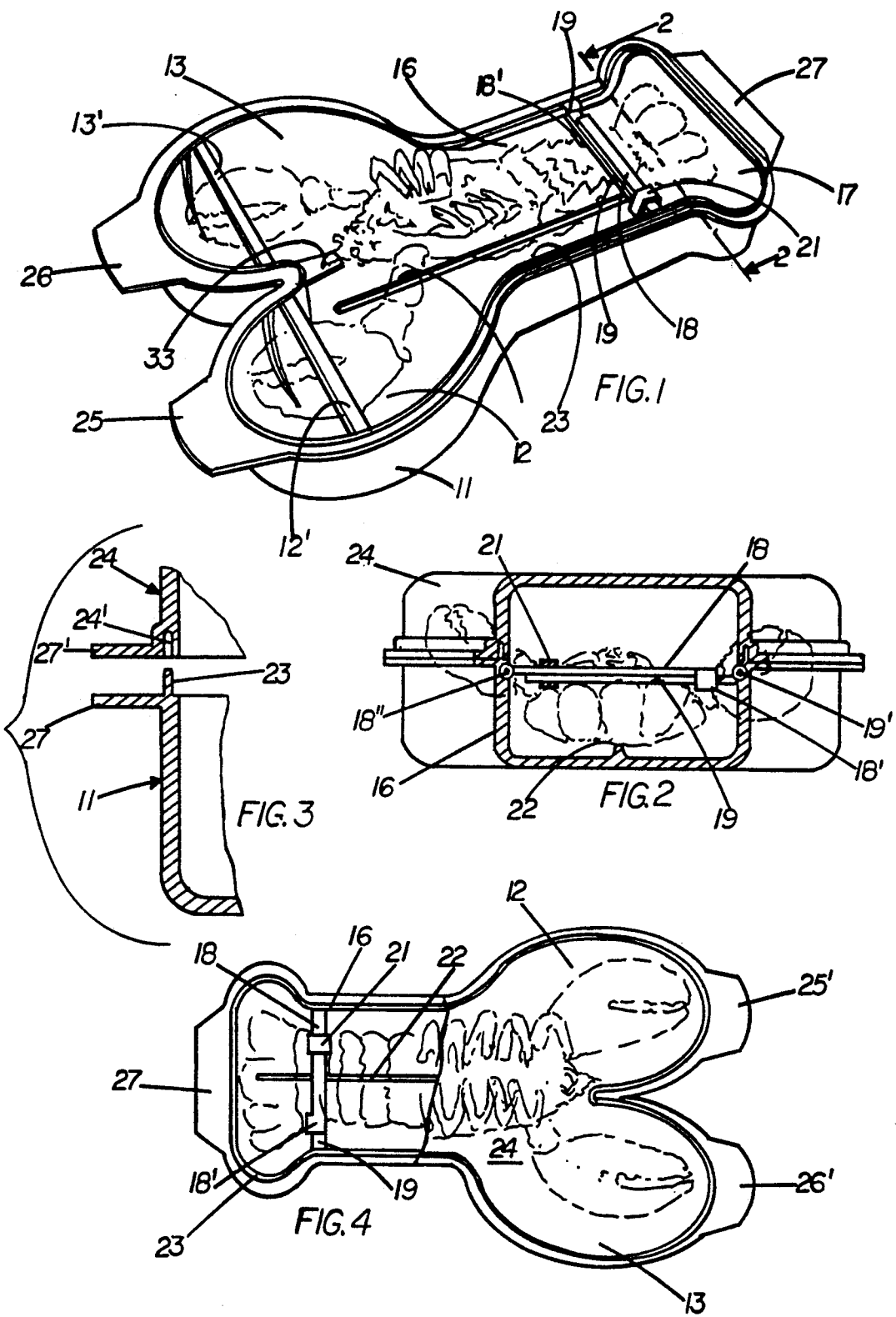

LOBSTER COOKING VESSEL FOR MICROWAVE OVENS

This invention relates to a cooking vessel for use in the cooking of lobsters from the Homaridae family or Palinuridae family in microwave ovens.

Lobsters are usually cooked by boiling in water or in a steam-supplied vessel which are unadaptable for use in microwave ovens. Lobsters are alive on being placed in a cooking vessel and with no means of placing the lobster so that its tail can be confined, the lobster can flip itself from the vessel. Such ordinary cooking vessels would not be satisfactory for microwave ovens.

It is therefore the principal object of the present invention to provide a cooking vessel suitable for use in a microwave oven in which the portions of the lobster such as the claws can be located in forward spaces separate from one another and the tail extended therefrom into an elongated space wherein the tail can be held by breakaway hinged parts extending from opposite sides of the vessel.

It is another object of the invention to provide such a vessel, with the above object in mind, wherein the vessel has an enclosure cover that has tight-fitting engagement with the bottom part in which the lobster will be fully contained while being cooked in the vessel.

It is still another object of the invention to provide a vessel for cooking a lobster having claws in a microwave oven with claw and tail receiving portions with means that will retain the lobster claws and tail therein with the lobster upon its back within the vessel.

It is a further object of the invention to provide a lobster cooking vessel for microwave ovens shaped to confine a lobster with claws which, by the use of a liner, may be made adaptable for the retention of a mock lobster or crayfish that has no claws and use still made of the claw retention and breakaway hinged parts to hold down its tail.

Further objects of the invention are to provide, with the other objects in mind, a lobster cooking vessel for use in microwave ovens which has a pleasing appearance, is inexpensive to manufacture, has a minimum number of parts, durable, will receive the lobster with little difficulty and will positively prevent its release by itself, effective and efficient in use.

According to the present invention, there is provided a bottom vessel shaped generally in the form on an extended lobster into which the lobster is placed on its back and in which there are means for retaining its claws and tail against movement and its escape from the vessel. The claws are extended under retaining strips and the tail when straightened is lowered into the longitudinally-extending portion of the vessel and retained by hinged parts extended respectively from the opposite sides of the vessel and joined together by a slide clamp.

This same vessel is made adaptable for use with a liner for containing a clawless lobster from the Palinuridae family which is extended into the longitudinal portion of the vessel and the tail retained by the same hinged parts extended over its tail. A corresponding cover is provided which has a continuous slot about its edge for receiving a tight-fitting extension surrounding the upper edge of the bottom part so that the parts when joined will be substantially airtight and the steam generated from a shallow water supply in the bottom part will be retained for effecting the cooking of the lobster. These parts are preferably formed of plastic that is transparent so that the lobster or crayfish can be readily viewed to ascertain its cooked condition and the end of its treatment within a given period of time in a microwave oven. The parts are particularly adaptable for the support of the lobster on its back and on a raised portion of the bottom part to insure good circulation of the steam around the lobster. A liner is provided for rock lobster or crayfish without claw spaces and the tail hold down parts will be hinged to extend over the liner and the head is held in the liner by a retaining strip on the liner.

Figure 6:
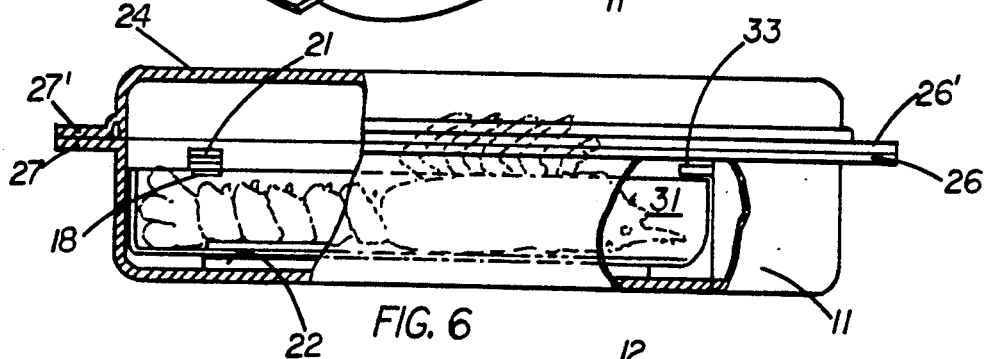
Figure 7:
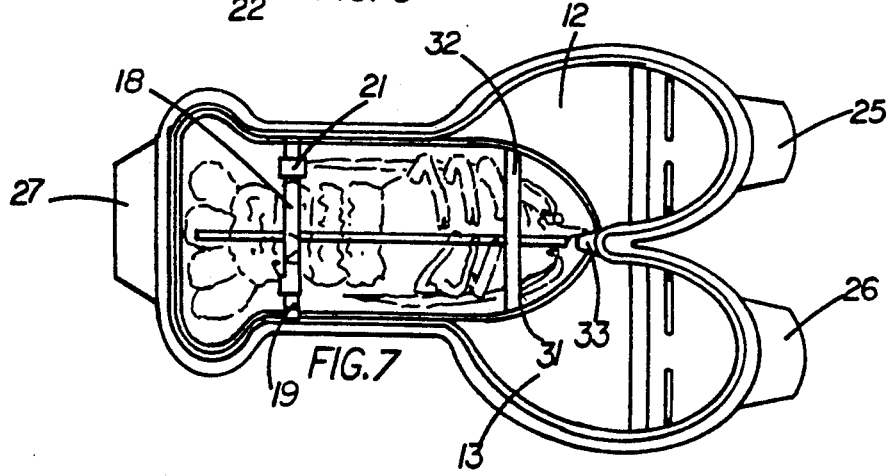

For a better understanding of the invention, reference may be had to the following detailed description taken in connection with the accompanying drawing, in which FIG. 1 is a top perspective view of the bottom part of the lobster cooking vessel and looking into its open top upon a lobster from the Homaridae family shown in phantom placed on its back therein, FIG. 2 is an enlarged cross-sectional view taken generally on line 2—2 of FIG. 1 with the cover attached to the bottom part and looking in elevation upon the two hold-down hinged parts respectively extending from the opposite sides of the bottom part and closed upon one another, FIG. 3 is an enlarged fragmentary exploded view showing the recessed lower edge of the cover and the extension on the bottom part adapted to be received by the cover recess so as to establish a steam-tight vessel of the parts, FIG. 4 is a top plan view of the joined bottom and cover parts with a portion of the cover part being broken away to look in plan upon the joined hinged retaining parts for the lobster tail, the vessel parts being preferably transparent so that the lobster may be viewed while being cooked, FIG. 5 is a perspective exploded view of the cover and bottom parts and of a liner adapted for receiving a mock lobster from the Palinuridae family or crayfish and over which the tail-retaining hinged parts on the main bottom part are used for retaining the lobster or crayfish tail in position when all parts are joined together, FIG. 6 is a side elevation view of the joined bottom and cover parts with the liner therein shown in phantom along the clawless lobster or crayfish, portions broken away to show the hinged tail retaining parts and the head retaining strip for the liner, FIG. 7 is a top plan view of the transparent open bottom part with the liner therein containing the crayfish.

Referring now particularly to FIGS. 1-4, there is shown a bottom part 11 shaped generally of a lobster and containing claw-receiving spaces 12 and 13 for receiving the claws of a lobster 14, as shown in phantom, and when placed upon its back within the bottom vessel part. Extending from the two separate claw-receiving portions 12 and 13 is an elongated portion 16 for receiving the tail of the lobster and fashioned at its end to provide a space 17 conforming generally to the lobster tail fins to retain them. Hinged connected respectively to opposite sides of the elongated portion 16 are respective breakaway hinged parts 18 and 19 adapted to overlie one another when extended over the tail of the lobster and retained by a slideable sleeve retainer 21. The end of the part 18 has a clip formation 18' attached to tightly fit over the sides of the hinged part 19 to retain the hinged parts against lateral shifting when extended parallel to one another and over the lobster's tail of the live lobster to prevent the lobster from releasing itself from the vessel by a flip of its tail. Across the claw space portions 12 and 13 are respectively respective fixed retaining strips 12' and 13' to fix the claws of the lobster therewithin.

As best seen in FIG. 2, the part 18 is hinged at 18" to the one side, whereas the part 19 is hinged at 19' to the other side. Extending upwardly from the inner surface of the bottom part is a rib 22 that extends into the logitudinal portion 16 centrally thereof to support the lobster upon its back and spaced upwardly from the bottom surface to permit passage of steam thereunder when the surface is covered with water used in the cooking operation in the microwave oven.

The bottom part 11 has on its top surface an upward extension 23, FIGS. 3 and 4, that surrounds the bottom vessel part and which is adapted to be received within a corresponding groove 24' of a preferably transparent cover part 24 in order that the vessel parts will be retained together in a tight manner to prevent leakage of steam generated while the vessel is placed in the microwave oven for the cooking operation and to retain the live lobster placed therein. Tabs 25 and 26 extend respectively laterally from the top edge of the bottom part from the respective claw portions 12 and 13 while an extension 27 extends laterally from the tail space portion 16 to facilitate the handling of the vessel in the microwave oven. By being able to retain the tail of the lobster in the manner illustrated by use of the hinged parts joined together and retained by slide sleeve 21, the lobster is not likely to separate itself from the vessel once it is placed in the microwave oven for the cooking operation.

Referring now to FIGS. 5, 6 and 7, there is shown the insertion of a liner 31, the nose of which is attached under a projection 33 on the bottom part 11 to retain the forward end of liner 31 thereto and to adapt this cooking vessel more for use for the similar cooking of clawless rock lobster or crayfish. This liner 31 is without portions to receive claws and will render the claw-type cooking vessel more suitable for the cooking of the clawless mock lobster or crayfish as best illustrated in FIG. 5. The same hinged locking parts 18 and 19 of the bottom part 11 are used for the tail of the clawless mock lobster or crayfish within the liner 31 and will extend from the sides of the bottom part in such a manner as to extend over the tail of the lobster or crayfish when it is lying in the liner vessel 31. A body-retaining strip extends across the far end of the liner 31. Water will be provided in the liner to produce steam and water can also be provided in the bottom part to insure the adequate generation of steam for cooking purposes. Structurally, the top and bottom parts are the same as already described in connection with FIGS. 1-4 that include the claw extension spaces 12 and 13. The clawless rock lobster or crayfish, of course, can be cooked in the bottom part alone, but will be better confined in the liner in a more tight manner to prevent its release at the start of the cooking process. The preferably transparent cover 24 is also provided with tabs 25', 26' and 27' corresponding respectively with the respective tabs 25, 26 and 27 of the bottom part 11 to facilitate the handling of the cover and bottom parts to turn over the assembled parts with the lobster therein in the microwave oven.

It should now be apparent that a suitable cooking vessel has been provided for the cooking singularly of a lobster from the Homaridae family and crayfish from the Palinuridae family in a microwave oven. The final cooking can be observed through the preferably transparent parts and the closed vessel removed when the final cooking has been performed.

While various changes may be made in the detailed construction, it shall be understood that such changes shall be within the spirit and scope of the present invention as defined by the pending claims.

What is claimed is:

1. A lobster cooking vessel for microwave ovens generally the overall shape of a claw lobster from the Homaridae family having divided separate outwardly expanded claw space portions for respectively receiving the respective claws of the lobster and an elongated portion extending therefrom for receiving the tail of the lobster said claw and tail portions having side walls of little more than the height of a lobster as laid out on its back throughout the full extent of the vessel and releasable mean mounted on and extending across the elongated portion between the side walls thereof for retaining the lobster tail in the elongated lobster tail portion when the live lobster is placed in the open cooking vessel.

2. A lobster cooking vessel for microwave ovens generally the overall shape of a lobster from the Homaridae family and having divided claw space portions and an elongated portion extending therefrom for receiving the tail of the lobster as defined in claim 1 and said releasable retaining means for the extended tail portion comprising breakaway hinged parts respectively extending from the respective opposite sides of the vessel which, when joined, extend over the tail of the lobster lying within the elongated portion whereby the lobster will be retained in a manner to prevent the upward flexing by itself and release from the vessel.

3. A lobster cooking vessel for microwave ovens as defined in claim 1 or 2 and a cover part corresponding in shape to the lobster cooking vessel and tightly fitted thereupon to enclose the cooking vessel and to further retain the live lobster.

4. A lobster cooking vessel for microwave ovens as defined in claim 3 and said cover part being transparent to permit the lobster to be viewed while being cooked.

5. A lobster cooking vessel as defined in claim 1 or 2 and retaining strips extended across the claw space portions of the lobster cooking vessel to retain the claws within the vessel.

6. A lobster cooking vessel for microwave ovens as defined in claim 3 having tab projections extending from the forward claw spaced portions and from the tail space portion for the effective handling of the vessel and corresponding tab projection provided on the cover part.

7. A lobster cooking vessel for microwave ovens as defined in claim 2 and a liner conforming generally in shape to a clawless lobster or crayfish from the Palinuridae family and adapted to be fitted into the vessel for the breakaway hinged parts to extend thereover to prevent release of the tail of the clawless lobster from within the liner and a retainer strip to hold the head of the clawless lobster or crayfish from within the liner.

8. A lobster cooking vessel for microwave ovens as defined in claim 1 and the end of said elongated portion being shaped to accommodate the lobster tail fins.

* * * * *

UNITED STATES PATENT AND TRADEMARK OFFICE
CERTIFICATE OF CORRECTION

PATENT NO. : 5,278,376
DATED : January 11, 1994
INVENTOR(S) : Samuel A. Cyr

It is certified that error appears in the above-indentified patent and that said Letters Patent is hereby corrected as shown below:

Column 1, line 36, change "mock" to --rock--.
Column 2, line 39, change "mock" to --rock--.
Column 3, line 43, change "mock" to --rock--.
Column 3, line 45, change "mock" to --rock--.

Signed and Sealed this

Thirty-first Day of January, 1995

Attest:

BRUCE LEHMAN

Attesting Officer

Commissioner of Patents and Trademarks